US010652727B2

(12) United States Patent
Zhang et al.

(10) Patent No.: US 10,652,727 B2
(45) Date of Patent: May 12, 2020

(54) SYSTEMS AND METHODS FOR CUSTOMIZING NETWORK DETECTION RESULTS

(71) Applicant: Facebook, Inc., Menlo Park, CA (US)

(72) Inventors: Luyang Zhang, Foster City, CA (US); Yingyi Liang, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 91 days.

(21) Appl. No.: 15/853,683

(22) Filed: Dec. 22, 2017

(65) Prior Publication Data

US 2019/0200210 A1   Jun. 27, 2019

(51) Int. Cl.
| H04W 8/18 | (2009.01) |
| H04L 12/26 | (2006.01) |
| H04W 8/24 | (2009.01) |
| H04W 8/02 | (2009.01) |
| H04W 24/08 | (2009.01) |
| H04W 8/26 | (2009.01) |

(52) U.S. Cl.
CPC .............. *H04W 8/18* (2013.01); *H04L 43/065* (2013.01); *H04L 43/0888* (2013.01); *H04W 8/02* (2013.01); *H04W 8/24* (2013.01); *H04W 24/08* (2013.01); *H04W 8/26* (2013.01)

(58) Field of Classification Search
CPC ........ H04L 43/065; H04W 8/18; H04W 8/24; H04W 8/02; H04W 24/02
See application file for complete search history.

(56) References Cited

U.S. PATENT DOCUMENTS

| 8,667,385 B1* | 3/2014 | Mui ...................... G06F 17/241 |
| | | 715/231 |
| 2012/0158205 A1* | 6/2012 | Hinman ............. G05B 23/0216 |
| | | 700/297 |
| 2016/0217159 A1* | 7/2016 | Dahan ................... G06F 16/256 |
| 2018/0115523 A1* | 4/2018 | Subbarayan ............ G06F 21/55 |

OTHER PUBLICATIONS

Gonguet et al.; Methods and Systems for Determining and Using Characteristics of Network Carriers in Connection with Access Requests; U.S. Appl. No. 15/298,105, filed Oct. 19, 2016.

* cited by examiner

*Primary Examiner* — El Hadji M Sall
(74) *Attorney, Agent, or Firm* — FisherBroyles, LLP (57) ABSTRACT

A computer-implemented method for customizing network detection results may include identifying a connection between a client device and a frontend server of a web-based computing system. The method may also include obtaining at least one criterion for customizing a network-carrier analysis of the connection for use by a backend application of the web-based computing system. In addition, the method may include performing, based on the criterion, the customized network-carrier analysis of the connection to create a customized report of network-carrier information about the connection. Furthermore, the method may include providing the customized report of network-carrier information to the backend application. Finally, the method may include performing, based on the customized report, at least one task associated with improving a function of the web-based computing system. Various other methods, systems, and computer-readable media are also disclosed.

20 Claims, 6 Drawing Sheets

SYSTEMS AND METHODS FOR CUSTOMIZING NETWORK DETECTION RESULTS

BACKGROUND

Users are increasingly accessing online content and services via various different types of devices and networks. As a result, online content and service providers are attempting to solve the complex problem of optimizing services, advertising, and/or backend analytics for these different devices and networks. While traditional network detection solutions may provide some limited information about a network connection, such solutions may not have adequate detection and/or analysis tools to meet the needs of many online content and service providers.

One of the issues with traditional network detection solutions is that they may fail to account for differing detection and analysis needs of online content and service providers. For example, advertisers may want information to help them properly tailor content for a specific client or a network carrier but may be limited in the detection signals they can use due to relationships with network carriers. As another example, content providers may want to know technical specifications of a user's device and/or network to provide a faster or smoother experience for the user. Unfortunately, traditional methods of identifying client devices and network carriers may not have the flexibility or capacity to meet these different backend requirements. Thus, as client and network carrier structures become more complex, there is an increased need to improve network detection and provide relevant network detection results to online content and service providers.

SUMMARY

As will be described in greater detail below, the instant disclosure describes various systems and methods for customizing network detection results to create reports useful to various different backend applications. In one example, a method for customizing network detection results may include identifying a connection between a client device and a frontend server of a web-based computing system. The method may also include obtaining at least one criterion for customizing a network-carrier analysis of the connection for use by a backend application of the web-based computing system. In addition, the method may include performing, based on the criterion, the customized network-carrier analysis of the connection to create a customized report of network-carrier information about the connection. Furthermore, the method may include providing the customized report of network-carrier information to the backend application. Finally, the method may also include performing, based on the customized report, at least one task associated with improving a function of the web-based computing system.

In one embodiment, identifying the connection between the client device and the frontend server may include detecting connection information at the frontend server, receiving the connection information from a request for content on the frontend server by the client device, and/or receiving the connection information from a client-side application on the client device. In this embodiment, the connection information may include an internet protocol (IP) address of the client device, an autonomous system number (ASN) of the client device, a location of the client device, a subscriber identity module (SIM) operator name, a network operator name, an access point name (APN), a mobile network code, a mobile country code, a network history for the client device, and/or a user history for a user of the client device. Additionally, in the above embodiment, the backend application may include a software application that analyzes the connection information to detect trends.

In some examples, obtaining the criterion for customizing the network-carrier analysis may include identifying the backend application and deducing the criterion based on identifying the backend application. Additionally or alternatively, obtaining the criterion may include receiving the criterion from the backend application.

In some embodiments, performing the customized network-carrier analysis may include analyzing the connection between the client device and the frontend server and/or determining a carrier type of the connection. Additionally, performing the customized network-carrier analysis may include adding relevant information to the customized report of network-carrier information based on the criterion, removing irrelevant information from the customized report of network-carrier information based on the criterion, and/or formatting the relevant information to comply with a format used by the backend application.

In one example, the customized report of network-carrier information may include a carrier type, a throughput of the connection, and/or a change from a network carrier used by the client device to a different network carrier. Additionally or alternatively, the customized report may include a type of data about the network carrier used by the client device, trend data about the network carrier used by the client device, a type of data about multiple network carriers, and/or trend data about multiple network carriers.

In one embodiment, performing the task associated with improving the function of the web-based computing system may include performing, by the backend application, an analysis of the customized report. In this embodiment, performing the analysis of the customized report may include detecting a trend in service of a network carrier of the client device, detecting a trend in usage of the network carrier by the client device, detecting a trend in usage of the network carrier by a plurality of client devices, determining a carrier strategy of the network carrier, and/or comparing the network carrier of the client device with at least one additional network carrier. In an additional or alternative embodiment, performing the task associated with improving the function of the web-based computing system may include customizing, by the frontend server, content delivered to the client device. In this embodiment, customizing the content delivered to the client device may include delivering content to the client device that differs from content delivered to a different client device, delivering content to client devices connected to the network carrier that differs from content delivered to client devices connected to a different network carrier, targeting the content to a user of the client device, and/or adjusting delivery of the content based on a trend detected by the backend application.

In addition, a corresponding system for customizing network detection results may include several modules stored in memory, including an identification module that identifies a connection between a client device and a frontend server of a web-based computing system. The system may also include an obtainment module that obtains at least one criterion for customizing a network-carrier analysis of the connection for use by a backend application of the web-based computing system. Additionally, the system may include an analysis module that performs, based on the criterion, the customized network-carrier analysis of the connection to create a customized report of network-carrier information about the connection. Furthermore, the system may include a provisioning module that provides the customized report of network-carrier information to the backend application. The system may also include a performance module that performs, based on the customized report, at least one task associated with improving a function of the web-based computing system. Finally, the system may include one or more processors that execute the identification module, the obtainment module, the analysis module, the provisioning module, and the performance module.

In some examples, the above-described method may be encoded as computer-readable instructions on a computer-readable medium. For example, a computer-readable medium may include one or more computer-executable instructions that, when executed by at least one processor of a web-based computing system, may cause the web-based computing system to identify a connection between a client device and a frontend server of the web-based computing system. The instructions may also cause the web-based computing system to obtain at least one criterion for customizing a network-carrier analysis of the connection for use by a backend application of the web-based computing system. Additionally, the instructions may cause the web-based computing system to perform, based on the criterion, the customized network-carrier analysis of the connection to create a customized report of network-carrier information about the connection. Furthermore, the instructions may cause the web-based computing system to provide the customized report of network-carrier information to the backend application. The instructions may also cause the web-based computing system to perform, based on the customized report, at least one task associated with improving a function of the web-based computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for customizing network detection results. As will be explained in greater detail below, embodiments of the instant disclosure may, by extrapolating from available information about network carriers and detecting the needs of downstream applications, provide more customized reports and/or useful information to the downstream applications. The disclosed systems and methods may collect information about the needs of a backend application and may also collect information about a network connection between a client device and a web-based system, such as the servers of a content provider. By using the information about the backend application to analyze and curate the carrier information, the systems and methods described herein may better customize network-carrier reports for the backend application. As an example, the disclosed systems and methods may determine that an advertising application needs information about specific network carrier types and may format the report to divide bandwidth information by carrier. As another example, the disclosed systems and methods may receive a signal requesting specific data from a business analytics department and may send only the requested data to the department. By providing customized reports of network-carrier information to these backend applications, the disclosed systems and methods may thereby facilitate more efficient and/or effective use of network-carrier information by backend applications.

In addition, the systems and methods described herein may improve the functioning of a computing device by delivering content that is more appropriate for a remote device, such as content that maximizes the technical capabilities of a network carrier or targeted content relevant to the device or a user. These systems and methods may also improve the fields of business intelligence and financial analysis for content providers by improving internal analytics and trend detection of network carrier strategies using the customized reports. Thus, the disclosed systems and methods may improve the ability of content providers to provide customized network detection data to backend applications and customized services to client devices.

Figure 1:
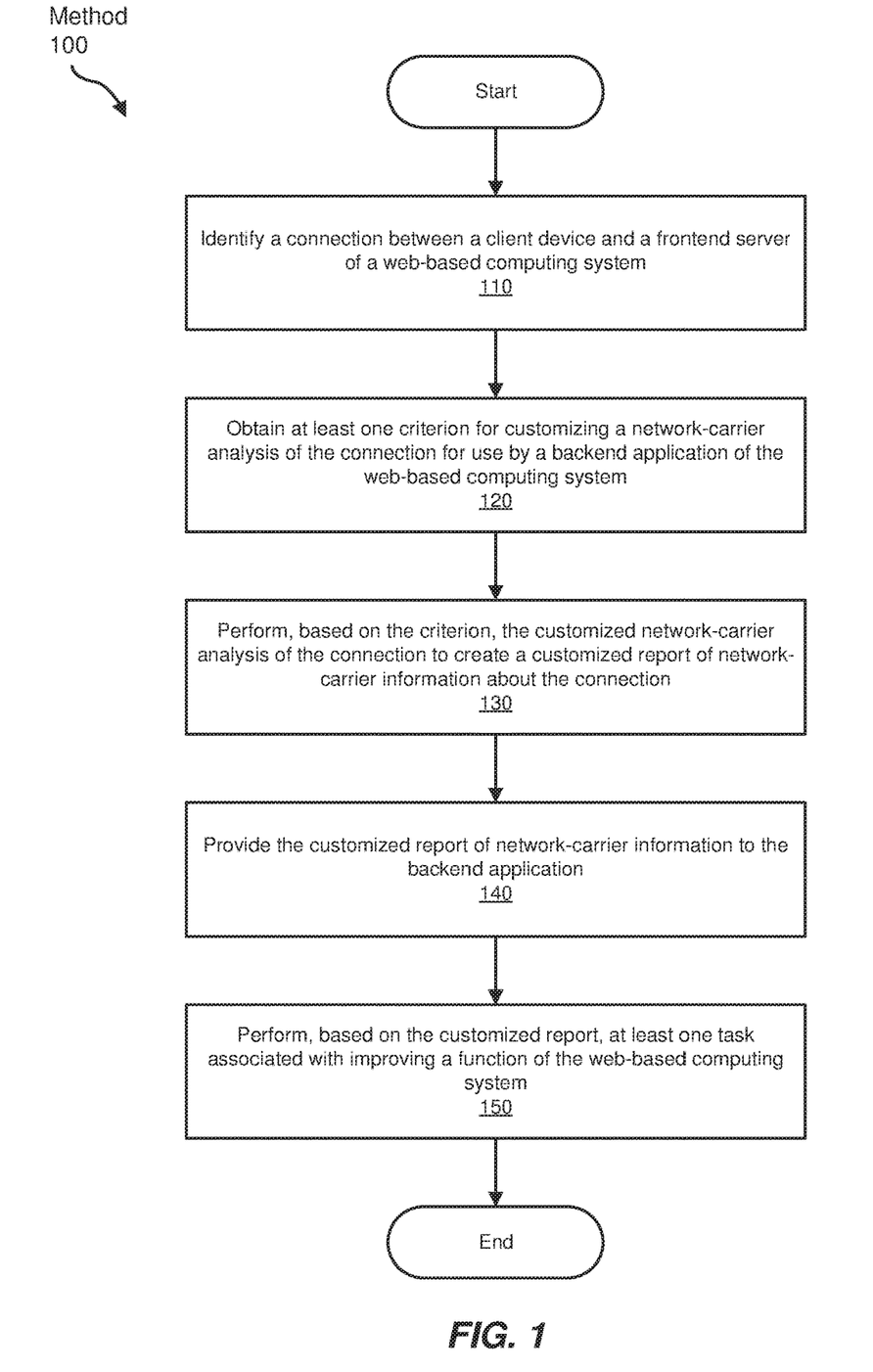
FIG. 1 is a flow diagram of an exemplary method for customizing network detection results.

The following will provide, with reference to FIG. 1, detailed descriptions of computer-implemented methods for customizing network detection results. Detailed descriptions of a corresponding example system will be provided in connection with FIG. 2. In addition, detailed descriptions of an exemplary identification of a network connection and an example backend application will be provided in connection with FIG. 3. Detailed descriptions of an exemplary network-carrier analysis and resulting customized report will be provided in connection with FIG. 4. Furthermore, detailed descriptions of an exemplary backend analysis and exemplary customized content will be provided in connection with FIG. 5, and descriptions of how embodiments of the instant disclosure may be implemented in an exemplary social-networking embodiment will be provided in connection with FIG. 6.

FIG. 1 is a flow diagram of an exemplary computer-implemented method 100 for customizing network detection results. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Figure 2:
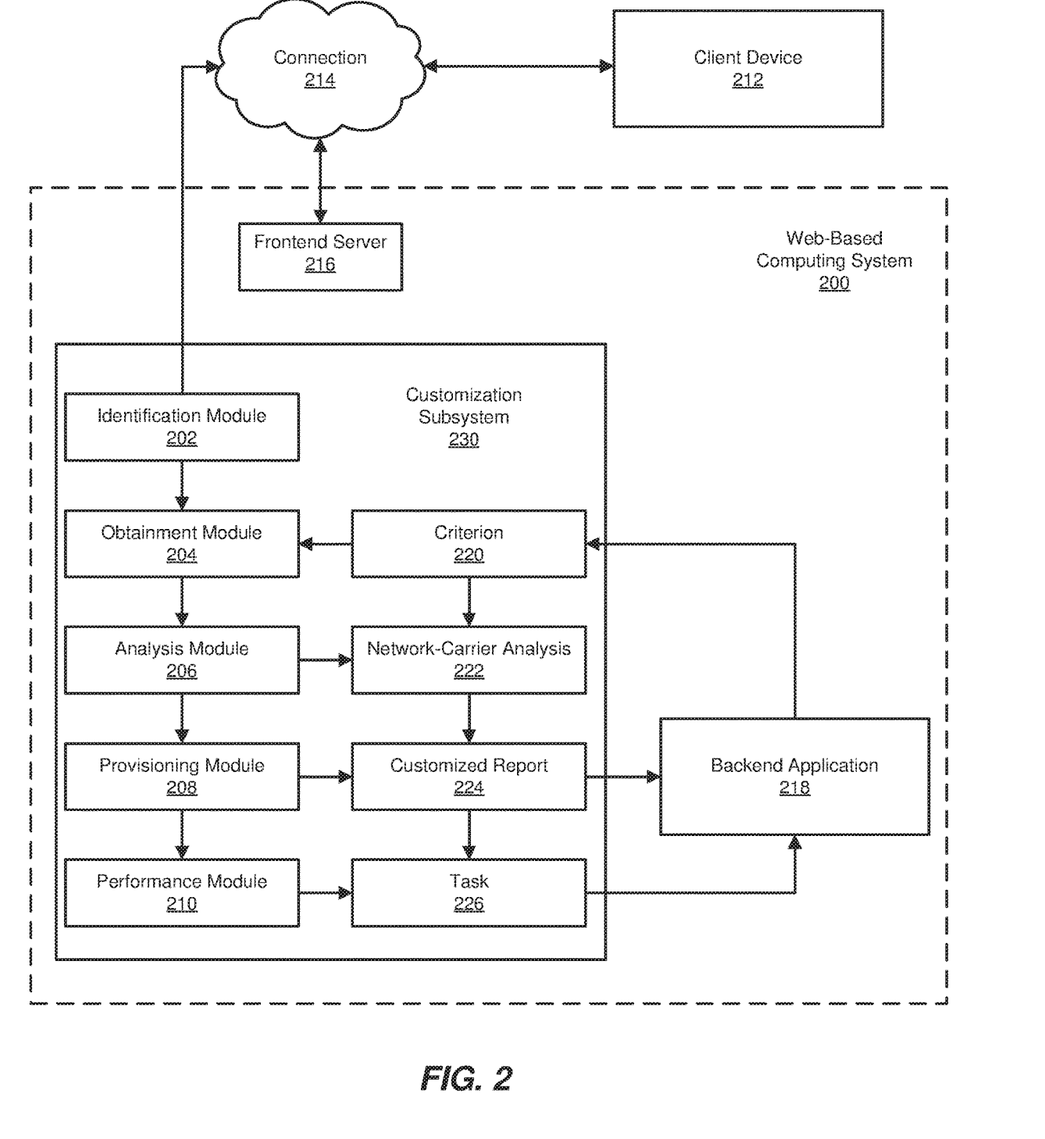
FIG. 2 is a block diagram of an exemplary system for customizing network detection results.

As illustrated in FIG. 1, at step 110, one or more of the systems described herein may identify a connection between a client device and a frontend server of a web-based computing system. For example, FIG. 2 is a block diagram of an exemplary web-based computing system 200 for customizing network detection results. As illustrated in FIG. 2, an identification module 202 may, as part of a frontend server 216, identify a connection 214 between a client device 212 and frontend server 216 of web-based computing system 200.

Client device 212 generally represents any type or form of computing device that is capable of reading computer-executable instructions. For example, client device 212 may represent endpoint devices running client-side applications that display online content to users. Additional examples of client device 212 include, without limitation, laptops, tablets, desktops, servers, cellular phones, Personal Digital Assistants (PDAs), multimedia players, embedded systems, wearable devices (e.g., smart watches, smart glasses, virtual reality headsets, etc.), gaming consoles, combinations of one or more of the same, and/or any other suitable computing device.

Frontend server 216 and/or a customization subsystem 230 generally represent any type or form of computing device, or set of computing devices, capable of storing and/or providing content over a network. For example, frontend server 216 may represent a computing device owned by a content provider that accepts content requests from client devices, such as client device 212, and responds with the requested content. Customization subsystem 230, which may be part of frontend server 216 and/or a backend application 218, may perform a variety of tasks associated with customizing network connection information for backend application 218. As discussed in greater detail below, customization subsystem 230 may include identification module 202, an obtainment module 204, an analysis module 206, a provisioning module 208, and/or a performance module 210 for performing one or more tasks.

Additional examples of frontend server 216 and/or customization subsystem 230 include, without limitation, security servers, application servers, web servers, storage servers, and/or database servers configured to run certain software applications and/or provide various security, web, storage, and/or database services. Although illustrated as a single entity in FIG. 2, frontend server 216 may include and/or represent a plurality of servers that work and/or operate in conjunction with one another.

In general, web-based computing system 200 may represent any type or form of computing device or combination of computing devices that provide a holistic service over a network connection, such as connection 214. In the example of FIG. 2, web-based computing system 200 may include frontend server 216 and backend application 218. Alternatively, web-based computing system 200 may include a plurality of frontend servers and/or a plurality of backend applications.

Connection 214 generally represents any medium or architecture capable of facilitating communication or data transfer such as a network and/or a network carrier service. In one example, connection 214 may facilitate communication between client device 212 and frontend server 216. In this example, connection 214 may facilitate communication or data transfer using wireless and/or wired connections. Examples of connection 214 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network connection.

Returning to FIG. 1, the systems described herein may perform step 110 in a variety of ways. For example, identification module 202 of FIG. 2 may identify connection 214 by detecting connection information at frontend server 216. In this example, frontend server 216 may automatically detect the connection information when connection 214 is established between client device 212 and frontend server 216. In another example, identification module 202 may receive the connection information from a request for content on frontend server 216 by client device 212. Additionally or alternatively, identification module 202 may receive the connection information from a client-side application, such as a social media application, running on client device 212. In this example, the client-side application may periodically send the connection information to frontend server 216.

Furthermore, in the above examples, the connection information may include a variety of data, such as an IP address, an ASN, and/or a location of client device 212. Additionally or alternatively, the connection information may include a SIM operator name, a network operator name, and/or an APN to help identify a network carrier. For mobile client devices, the connection information may additionally or alternatively include a mobile network code and/or a mobile country code. In a further example, the connection information may also include a network history for client device 212 and/or a user history for a user of client device 212.

Figure 3:
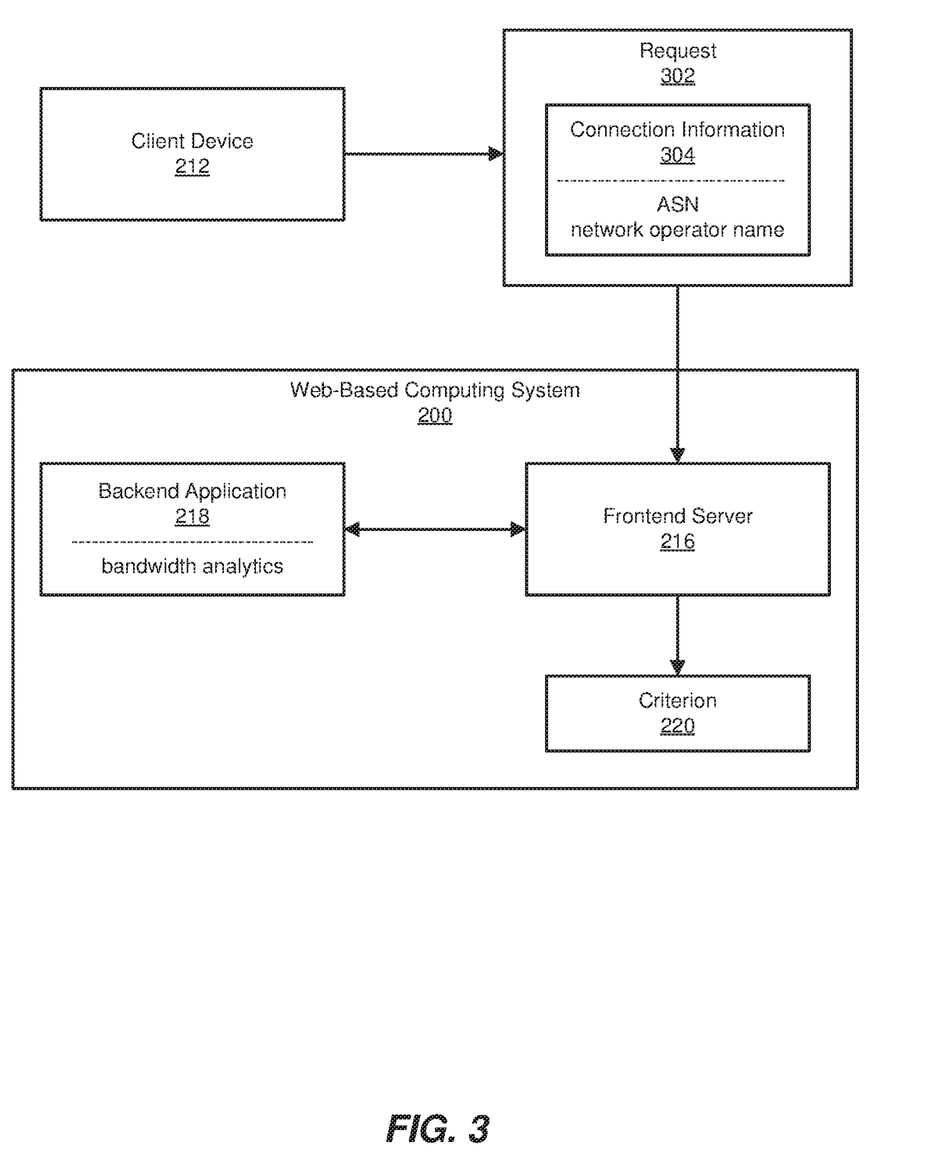
FIG. 3 is a block diagram of an exemplary identification of a network connection and an example backend application.

As illustrated in FIG. 3, client device 212 may send a request 302 containing connection information 304 to frontend server 216 as part of web-based computing system 200. In this example, client device 212 may send connection information 304, including an ASN and a network operator name, in an HTTP header as part of request 302 sent to frontend server 216. In alternate examples, frontend server 216 may request connection information 304 from client device 212 and/or an application running on client device 212.

Returning to FIG. 1, at step 120, one or more of the systems described herein may obtain one or more criteria for customizing a network-carrier analysis of the connection for use by a backend application of the web-based computing system. For example, obtainment module 204 may, as part of frontend server 216 in FIG. 2, obtain a criterion 220 for customizing a network-carrier analysis 222 of connection 214 for use by backend application 218 of web-based computing system 200. While represented as singular in FIG. 2, criterion 220 may represent a plurality of criteria for backend application 218.

The systems described herein may perform step 120 in a variety of ways. For example, obtainment module 204 may receive reporting criteria via direct input (e.g., from an administrator) to customization subsystem 230, an administrator, backend application 218, or from any other system. Additionally or alternatively, obtainment module 204 may deduce the criteria by analyzing information from and/or about backend application 218. Obtainment module 204 may also obtain reporting criteria in any other suitable manner.

Criterion 220 may represent and/or include a variety of types of information that may be used to obtain and customize carrier information. In some embodiments, criterion 220 may indicate the type of network information that may or may not be used in backend analysis or reporting. For example, criterion 220 may indicate that backend application 218 is associated with a team that works with mobile partners. In this example, criterion 220 may directly or indirectly indicate that certain types of signals (e.g., IP blocks) should not be reported to or used by backend application 218. Alternatively, criterion 220 may indicate the availability of various types of signals for connection 214. Backend application 218, in the above example, may selectively require criterion 220 to provide information about the availability of mobile signals or circumstances under which the signals are available to client device 212.

As another example, criterion 220 may indicate a level of network detection accuracy needed by backend application 218. Criterion 220 may also indicate that backend application 218 may need information about who the service provider for the connection is, whether the service provider is a virtual network provider, etc. In some examples, backend application 218 may directly input criterion 220 to indicate a request for specific information, such as only information related to the service provider or only information related to a network infrastructure provider.

In some embodiments, backend application 218 may represent a software application that analyzes the connection information, such as connection information 304 of FIG. 3, to detect trends. For example, as shown in FIG. 3, frontend server 216 may determine backend application 218 performs bandwidth analytics and, subsequently, deduce criterion 220 to include information relevant to bandwidth. As another example, backend application 218 may represent an advertising application that generates targeted advertisements for client devices. In another example, backend application 218 may represent a business intelligence unit that performs analyses using software applications to detect network carrier strategies.

Backend application 218 may be installed on any suitable type or form of system, including an end-user system of a developer, on a datacenter server, and/or any other system capable of receiving, analyzing, and/or utilizing network carrier information. As used herein, the term "network carrier" generally refers to a service or entity that provides a wired or wireless network connection, such as connection 214, to a client device.

Returning to FIG. 1, at step 130, one or more of the systems described herein may perform, based on the criterion, the customized network-carrier analysis of the connection to create a customized report of network-carrier information about the connection. For example, analysis module 206 may, as part of frontend server 216 in FIG. 2, perform, based on criterion 220, customized network-carrier analysis 222 of connection 214 to create a customized report 224 of network-carrier information about connection 214. The customization may be performed as part of analyzing the connection (e.g., if criterion 220 indicates that only certain detection signals may be used) and/or as part of generating or modifying a connection-information report.

The systems described herein may perform step 130 in a variety of ways. In one embodiment, analysis module 206 may perform customized network-carrier analysis 222 by analyzing connection 214 and/or determining a carrier type of connection 214. For example, analysis module 206 may perform a database lookup using the ASN of client device 212 provided in connection information 304 to determine the identity of the network carrier used by client device 212 and, therefore, the carrier type of the network carrier. In this embodiment, the carrier type may include a mobile network operator (MNO), a mobile virtual network operator (MVNO), or a mobile virtual network enabler (MVNE). An MNO may represent a network carrier (e.g., AT&T) that owns physical hardware and network structures to provide networking services. In contrast, an MVNO may create a virtual network (e.g., MetroPCS) and lease the networking hardware and bandwidth from other network carriers. Conversely, an MVNE may manage and provide network infrastructure to MVNOs.

In additional embodiments, analysis module 206 may create customized report 224 from network-carrier analysis 222 by adding relevant information to customized report 224 based on criterion 220 and/or removing irrelevant information from customized report 224 based on criterion 220. For example, criterion 220 may indicate a requirement of backend application 218 for information on a local network infrastructure provider in place of the service provider when client device 212 is roaming. In this example, analysis module 206 may remove service provider information from customized report 224 in favor of network infrastructure provider information after determining, by network-carrier analysis 222, that client device 212 is not in a standard service area. Additionally or alternatively, analysis module 206 may format the relevant information in customized report 224 to comply with a format used by backend application 218.

In some examples, customized report 224 may include a carrier type, a throughput of connection 214, a change from a network carrier used by client device 212 to a different network carrier, a type of data about the network carrier used by client device 212, trend data about the network carrier used by client device 212, a type of data about multiple network carriers, and/or trend data about multiple network carriers. For example, customized report 224 for an advertising application requiring bandwidth information may include the carrier type and the throughput of connection 214. As another example, customized report 224 may include data about multiple network carriers that include various carrier types and the average throughput for each network carrier, grouped by carrier type.

Figure 4:
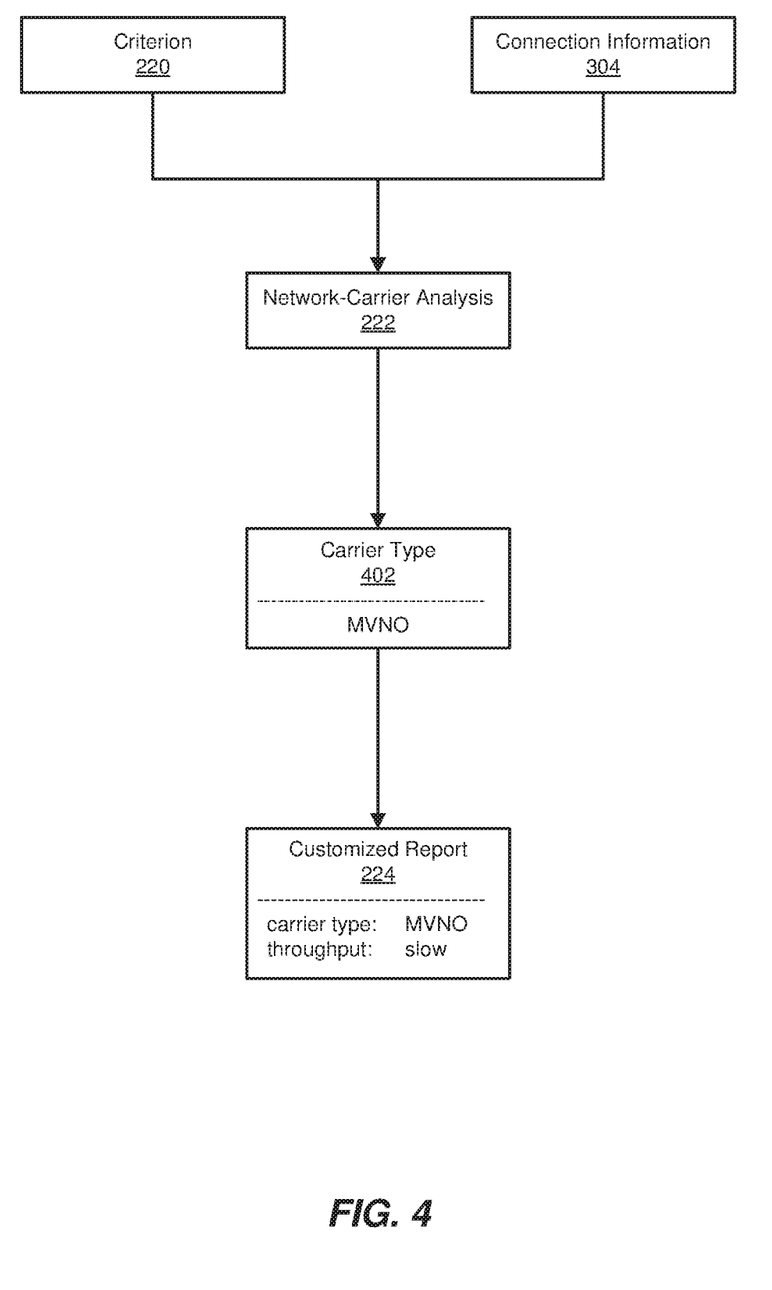
FIG. 4 is a block diagram of an exemplary network-carrier analysis and resulting customized report.

As illustrated in FIG. 4, network-carrier analysis 222 may analyze connection information 304 to determine a carrier type 402. Network-carrier analysis 222 may determine that carrier type 402 is a mobile virtual network operator (MVNO), that carrier type 402 is a particular type of MVNO (e.g., a branded reseller, a service provide, an enhanced service provider, a full MVNO, etc.), that carrier type 402 is a mobile network operator (MNO) of one or more communication infrastructure elements (e.g., wireless network infrastructure, back haul infrastructure, provisioning system, repair organizations, etc.), and/or may determine that carrier type 402 in any other type of carrier. Carrier type 402 may be included in customized report 224 along with other relevant information for carrier type 402 (e.g., throughput) based on criterion 220.

Returning to FIG. 1, at step 140, one or more of the systems described herein may provide the customized report of network-carrier information to the backend application. For example, provisioning module 208 may, as part of frontend server 216 in FIG. 2, provide customized report 224 to backend application 218.

The systems described herein may perform step 140 in a variety of ways. In one embodiment, provisioning module 208 may directly transmit customized report 224 to backend application 218. In another embodiment, provisioning module 208 may provide customized report 224 to a user or administrator of backend application 218, such as by sending an email to an inbox of the user or administrator. Furthermore, provisioning module 208 may provide a plurality of customized reports to backend application 218 and/or may provide customized report 224 to a plurality of backend applications. For example, backend application 218 may require customized reports for a plurality of client device connections. In another example, customized report 224 may satisfy the criteria for multiple backend applications requesting similar data.

Returning to FIG. 1, at step 150, one or more of the systems described herein may perform, based on the customized report, one or more tasks associated with improving a function of the web-based computing system. For example, performance module 210 may, as part of frontend server 216 in FIG. 2, perform, based on customized report 224, a task 226 associated with improving a function of web-based computing system 200.

The systems described herein may perform step 150 in a variety of ways. In some embodiments, such as the example of FIG. 2, performance module 210 may perform task 226 by directing backend application 218 to perform an analysis of customized report 224. In these embodiments, performing the analysis of customized report 224 may include detecting a trend in service of a network carrier of client device 212, detecting a trend in usage of the network carrier by client device 212, detecting a trend in usage of the network carrier by a plurality of client devices, determining a carrier strategy of the network carrier, and/or comparing the network carrier of client device 212 with at least one additional network carrier. For example, a business analytics application may perform additional analyses of customized report 224 to determine how well the network carrier is performing in a particular geographical region based on bandwidth and reach. Backend application 218 may then compare the performance to other network carriers to determine carrier priority.

In other embodiments, performance module 210 may perform task 226 by customizing, at frontend server 216, content delivered to client device 212. In these embodiments, customizing the content may include delivering content to client device 212 that differs from content delivered to a different client device, delivering content to client devices connected to the network carrier that differs from content delivered to client devices connected to a different network carrier, targeting the content to a user of client device 212, and/or adjusting delivery of the content based on a trend detected by backend application 218. In the above example, backend application 218 may customize the content to cater to a particular region for a network carrier that is more prominent in the region.

Figure 5:
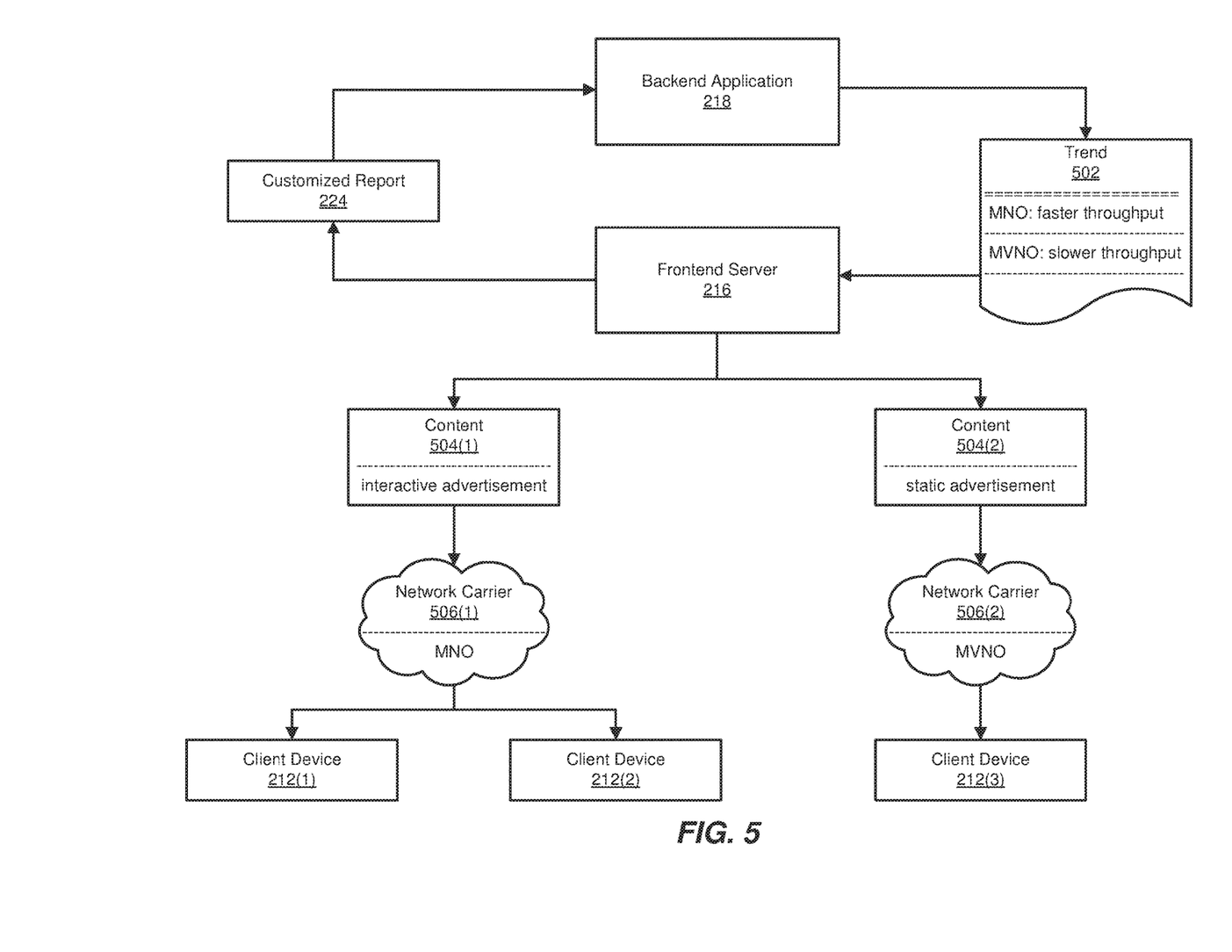
FIG. 5 is a block diagram of an exemplary backend analysis and exemplary customized content.

As illustrated in the example of FIG. 5, frontend server 216 may send customized report 224 to backend application 218 for additional analyses. In this example, customized report 224 may contain information about network carriers, include a network carrier 506(1) and a network carrier 506(2). In alternate examples, frontend server 216 may send a separate customized report for each network carrier and/or each client device. In the example of FIG. 5, backend application 218 may then detect a trend 502 that MNO network carriers have faster throughput than MVNO network carriers. In this example, backend application 218 may be an advertising application customizing advertisements for network carriers. Subsequently, frontend server 216 may utilize trend 502 to customize content 504(1) and content 504(2) for network carrier 506(1) and network carrier 506(2) such that the faster MNO network carrier 506(1) receives an interactive advertisement while the slower MVNO network carrier 506(2) receives a static version of the same advertisement. Client devices 212(1) and 212(2) connected to network carrier 506(1) may then receive content 504(1), and a client device 212(3) connected to network carrier 506(2) may receive content 504(2).

Figure 6:
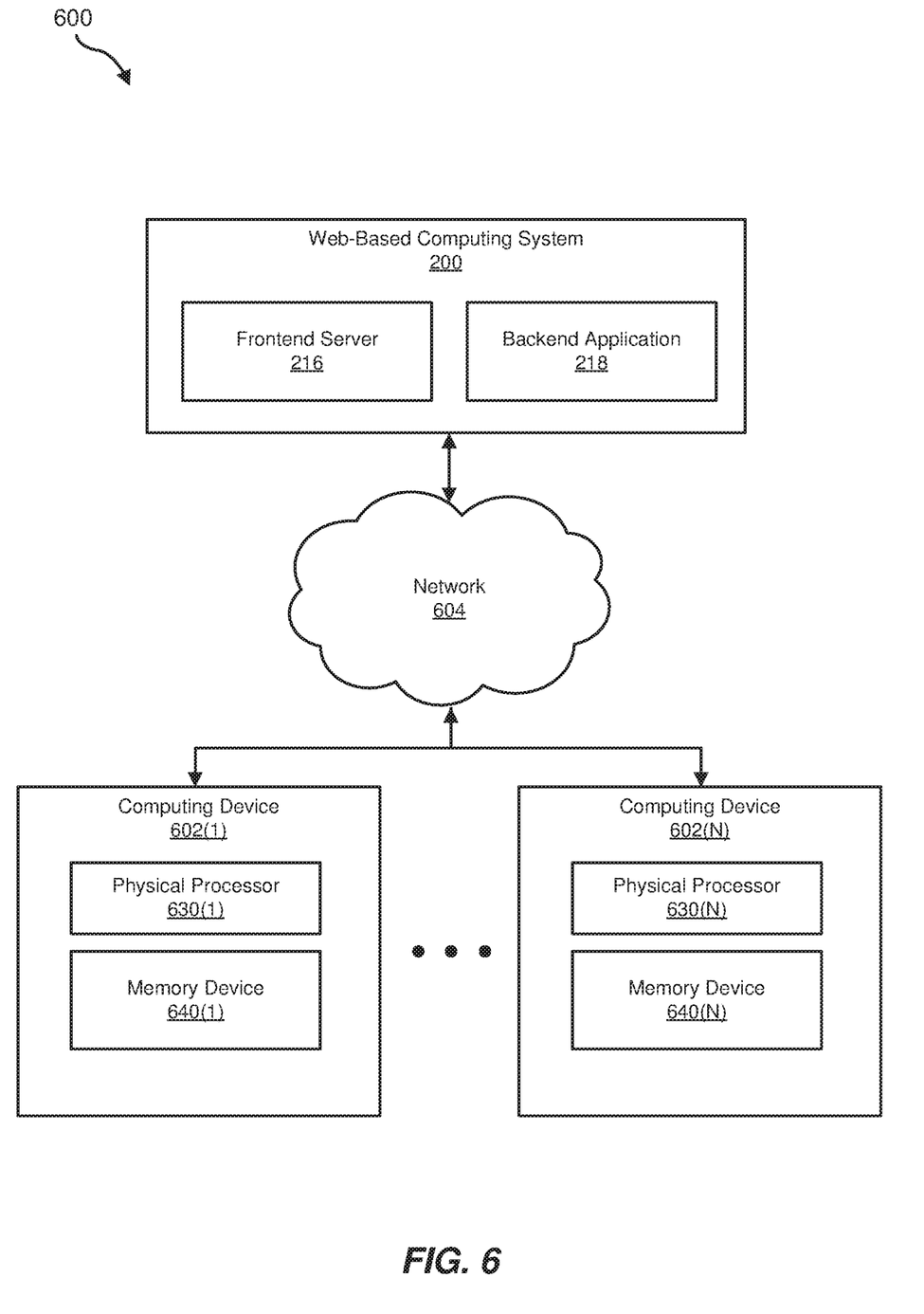
FIG. 6 is a block diagram of a social networking environment in which embodiments of the instant disclosure may be implemented.

FIG. 6 illustrates an exemplary network environment 600 (such as a social network environment) in which aspects of the present disclosure may be implemented. As shown, network environment 600 may include a plurality of computing devices 602(1)-(N), a network 604, and web-based computing system 200. In one example, web-based computing system 200 may host a social network or may be part of a system that hosts a social network. In this example, the infrastructure of web-based computing system 200 may include various interconnected frontend servers (e.g., frontend server 216), backend systems (e.g., backend application 218, which may be installed on a backend server, a user system, etc.), and/or any other suitable social networking infrastructure components (e.g., various data center modules).

Computing devices 602(1)-(N) may each represent a client device or a user device, such a desktop computer, laptop computer, tablet device, smartphone, or other computing device. Each of computing devices 602(1)-(N) may include a physical processor (e.g., physical processors 630(1)-(N)), which may represent a single processor or multiple processors, and a memory device (e.g., memory devices 640(1)-(N)), which may store instructions (e.g., software applications) or data.

Computing devices 602(1)-(N) may be communicatively coupled to web-based computing system 200 through network 604. Network 604 may be any communication network, such as the Internet, a Wide Area Network (WAN), or a Local Area Network (LAN), and may include various types of communication protocols and physical connections.

As noted, web-based computing system 200 may host a social network, and in such embodiments, computing devices 602(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

As explained above, the disclosed systems and methods may, by detecting information about network carriers used by client devices, customize the results of the network detection to be used for downstream analyses of the network carriers. Specifically, the disclosed systems and methods may first identify a network connection between a client device and a web-based system and collect information about the identified connection. By customizing a connection analysis, the systems and methods described herein may then provide a custom report tailored to a backend application based on signaled criteria. For example, a backend application may request product behavior information from a frontend server to help improve content delivery by a content provider. Alternatively, the disclosed systems and methods may determine the information required by the backend application by detecting the types of analyses to be run.

Additionally, the systems and methods described herein may provide the customized reports to the backend application for further analyses. In some examples, the systems and methods described herein may detect trends in the usage of network carriers. For example, the disclosed systems and methods may detect scenarios in which users are associated with different network carriers to help determine trends in user behaviors and/or carrier strategies. Furthermore, by customizing content sent from the frontend server to client devices based on trends detected by backend applications, the disclosed systems and methods may provide better and more customized service to clients. Thus, the systems and methods described herein may improve the detection and customization of network carrier information.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application or multiple modules or applications. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive network connection information to be transformed, transform the information, output a result of the transformation to a storage or output device, use the result of the transformation to customize a network-carrier report, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying a connection between a client device and a frontend server of a web-based computing system by detecting network connection information;
   obtaining at least one criterion for customizing a network-carrier analysis of the connection for use by a backend application of the web-based computing system;
   performing, based on the criterion, the customized network-carrier analysis of the connection to create a customized report of network-carrier information about a network carrier of the client device;

providing the customized report of network-carrier information to the backend application; and performing, based on the customized report, at least one task associated with improving a function of the web-based computing system, wherein performing the task comprises:

performing, by the backend application, an analysis of the customized report; and determining a carrier strategy of the network carrier.

2. The method of claim 1, wherein identifying the connection between the client device and the frontend server comprises at least one of:

detecting connection information at the frontend server;

receiving the connection information from a request for content on the frontend server by the client device; or receiving the connection information from a client-side application on the client device.

3. The method of claim 2, wherein the connection information comprises at least one of:

an internet protocol (IP) address of the client device;

an autonomous system number (ASN) of the client device;

a location of the client device;

a subscriber identity module (SIM) operator name;

a network operator name;

an access point name (APN);

a mobile network code;

a mobile country code;

a network history for the client device; or a user history for a user of the client device.

4. The method of claim 2, wherein the backend application comprises a software application that analyzes the connection information to detect trends.

5. The method of claim 1, wherein obtaining the criterion for customizing the network-carrier analysis comprises at least one of:

identifying the backend application;

deducing the criterion based on identifying the backend application; or receiving the criterion from the backend application.

6. The method of claim 1, wherein performing the customized network-carrier analysis comprises at least one of:

analyzing the connection between the client device and the frontend server;

determining a carrier type of the connection;

adding relevant information to the customized report of network-carrier information based on the criterion;

removing irrelevant information from the customized report of network-carrier information based on the criterion; or formatting the relevant information to comply with a format used by the backend application.

7. The method of claim 1, wherein the customized report of network-carrier information comprises at least one of:

a carrier type;

a throughput of the connection;

a change from the network carrier used by the client device to a different network carrier;

a type of data about the network carrier used by the client device;

trend data about the network carrier used by the client device;

a type of data about multiple network carriers; or trend data about multiple network carriers.

8. The method of claim 1, wherein performing the task associated with improving the function of the web-based computing system comprises customizing, by the frontend server, content delivered to the client device.

9. The method of claim 1, wherein performing the analysis of the customized report comprises at least one of:

detecting a trend in service of the network carrier of the client device;

detecting a trend in usage of the network carrier by the client device;

detecting a trend in usage of the network carrier by a plurality of client devices; or comparing the network carrier of the client device with at least one additional network carrier.

10. The method of claim 8, wherein customizing the content delivered to the client device comprises at least one of:

delivering content to the client device that differs from content delivered to a different client device;

delivering content to client devices connected to the network carrier that differs from content delivered to client devices connected to a different network carrier;

targeting the content to a user of the client device; or adjusting delivery of the content based on a trend detected by the backend application.

11. A system comprising:

an identification module, stored in memory, that identifies a connection between a client device and a frontend server of a web-based computing system by detecting network connection information;

an obtainment module, stored in memory, that obtains at least one criterion for customizing a network-carrier analysis of the connection for use by a backend application of the web-based computing system;

an analysis module, stored in memory, that performs, based on the criterion, the customized network-carrier analysis of the connection to create a customized report of network-carrier information about a network carrier of the client device;

a provisioning module, stored in memory, that provides the customized report of network-carrier information to the backend application;

a performance module, stored in memory, that performs, based on the customized report, at least one task associated with improving a function of the web-based computing system, wherein performing the task comprises:

performing, by the backend application, an analysis of the customized report; and determining a carrier strategy of the network carrier; and at least one processor that executes the identification module, the obtainment module, the analysis module, the provisioning module, and the performance module.

12. The system of claim 11, wherein the identification module identifies the connection between the client device and the frontend server by at least one of:

detecting connection information at the frontend server;

receiving the connection information from a request for content on the frontend server by the client device; or receiving the connection information from a client-side application on the client device.

13. The system of claim 12, wherein the connection information comprises at least one of:

an internet protocol (IP) address of the client device;

an autonomous system number (ASN) of the client device;

a location of the client device;

a subscriber identity module (SIM) operator name;

a network operator name;

an access point name (APN);
a mobile network code;
a mobile country code;
a network history for the client device; or
a user history for a user of the client device.

14. The system of claim 12, wherein the backend application comprises a software application that analyzes the connection information to detect trends.

15. The system of claim 11, wherein the obtainment module obtains the criterion for customizing the network-carrier analysis by at least one of:
   identifying the backend application;
   deducing the criterion based on identifying the backend application; or
   receiving the criterion from the backend application.

16. The system of claim 11, wherein the analysis module performs the customized network-carrier analysis by at least one of:
   analyzing the connection between the client device and the frontend server;
   determining a carrier type of the connection;
   adding relevant information to the customized report of network-carrier information based on the criterion;
   removing irrelevant information from the customized report of network-carrier information based on the criterion; or
   formatting the relevant information to comply with a format used by the backend application.

17. The system of claim 11, wherein the customized report of network-carrier information comprises at least one of:
   a carrier type;
   a throughput of the connection;
   a change from the network carrier used by the client device to a different network carrier;
   a type of data about the network carrier used by the client device;
   trend data about the network carrier used by the client device;
   a type of data about multiple network carriers; or
   trend data about multiple network carriers.

18. The system of claim 11, wherein the performance module performs the task associated with improving the function of the web-based computing system by:
   customizing, by the frontend server, content delivered to the client device.

19. The system of claim 11, wherein performing the analysis of the customized report comprises at least one of:
   detecting a trend in service of the network carrier of the client device;
   detecting a trend in usage of the network carrier by the client device;
   detecting a trend in usage of the network carrier by a plurality of client devices; or
   comparing the network carrier of the client device with at least one additional network carrier.

20. A non-transitory computer-readable medium comprising one or more computer-executable instructions that, when executed by at least one processor of a web-based computing system, cause the web-based computing system to:
   identify a connection between a client device and a frontend server of the web-based computing system by detecting network connection information;
   obtain at least one criterion for customizing a network-carrier analysis of the connection for use by a backend application of the web-based computing system;
   perform, based on the criterion, the customized network-carrier analysis of the connection to create a customized report of network-carrier information about a network carrier of the client device;
   provide the customized report of network-carrier information to the backend application; and
   perform, based on the customized report, at least one task associated with improving a function of the web-based computing system, wherein performing the task comprises:
   performing, by the backend application, an analysis of the customized report; and
   determining a carrier strategy of the network carrier.

* * * * *

UNITED STATES PATENT AND TRADEMARK OFFICE
CERTIFICATE OF CORRECTION

PATENT NO. : 10,652,727 B2
APPLICATION NO. : 15/853683
DATED : May 12, 2020
INVENTOR(S) : Luyang Zhang et al.

It is certified that error appears in the above-identified patent and that said Letters Patent is hereby corrected as shown below:

In the Claims

Column 16, Line 3, Claim 18, delete "by:" and insert -- by -- therefor.

Signed and Sealed this
Seventh Day of July, 2020

Andrei Iancu
*Director of the United States Patent and Trademark Office*